United States Patent [19]
Sasaki

[11] Patent Number: 5,076,116
[45] Date of Patent: Dec. 31, 1991

[54] SHIFT CONTROL SYSTEM OF AN AUTOMATIC TRANSMISSION

[75] Inventor: Kazuo Sasaki, Hiroshima, Japan

[73] Assignee: Mazda Motor Corporation, Hiroshima, Japan

[21] Appl. No.: 589,604

[22] Filed: Sep. 28, 1990

[30] Foreign Application Priority Data

Sep. 29, 1989 [JP] Japan .................. 1-254814

[51] Int. Cl.⁵ .............................. B60K 41/18
[52] U.S. Cl. ................................ 74/866
[58] Field of Search ............................ 74/866

[56] References Cited

U.S. PATENT DOCUMENTS

| 4,463,427 | 7/1984 | Bonnetain et al. | 74/866 X |
|---|---|---|---|
| 4,539,868 | 9/1985 | Habu | 74/866 X |
| 4,584,906 | 4/1986 | Nagaoka et al. | 74/866 |
| 4,635,508 | 1/1987 | Tatsumi | 74/866 |
| 4,667,540 | 5/1987 | Yagi | 74/866 |
| 4,732,246 | 3/1988 | Tateno et al. | 74/866 X |
| 4,819,513 | 4/1989 | Morimoto | 74/866 |
| 4,827,803 | 5/1989 | Miyawaki | 74/866 |
| 4,841,815 | 6/1989 | Takahashi | 74/866 |
| 4,843,913 | 7/1989 | Miyawaki | 74/866 |
| 4,905,544 | 3/1990 | Ganoung | 74/866 |

Primary Examiner—Allan D. Herrmann
Assistant Examiner—William O. Trousdell
Attorney, Agent, or Firm—Fish & Richardson

[57] ABSTRACT

A shift characteristic of an automatic transmission is altered in accordance with a load of an engine and a change rate the load of the engine. The shift characteristic may have a power mode and an economy mode, and the shift characteristic is switched between the power mode and the economy mode when the load of the engine becomes a predetermined reference value. When the load of the engine becomes equal to or larger than the reference value, the economy mode is shifted to the power mode. The reference value is changed in accordance with a change rate of the load of the engine, and the reference value becomes smaller as the change rate becomes larger. This construction allows the shift characteristic of the automatic transmission to be altered so as to be appropriate for the requirement by the operation for acceleration.

13 Claims, 6 Drawing Sheets

SHIFT CONTROL SYSTEM OF AN AUTOMATIC TRANSMISSION

BACKGROUND OF THE INVENTION

1. Field of the Invention

The present invention relates to a shift control system of an automatic transmission adapted to appropriately alter a shift characteristic of the automatic transmission.

2. Description of Related Art

Recently commercially available automatic transmissions are generally designed so as to have its shift characteristics altered in an appropriate way. For such automatic transmissions, there are prepared two previously mapped shift characteristics, for example, an economy mode which is mileage-oriented and a power mode which is output-oriented and in which the shift line is set on the side of a high vehicle speed rather than the economy mode, thereby performing a shift control under a desired shift characteristic manually selected.

Japanese Patent Unexamined Publication (kokai) No. 8,983/1982 discloses a shift control system in which the shift characteristic is automatically altered in accordance with the load of the engine. Specifically, the shift control system performs a shift control on the basis of a pre-mapped economy mode at an ordinary driving state, while the shift control system alters the shift control to the output-oriented shift characteristic on the basis of the shift characteristic of the economy mode when the load of the engine is equal to or larger than a predetermined reference value, for example, when a throttle valve is three quarters or more open. The alteration of the shift characteristic forms the shift characteristic for the power mode by altering the shift line for the economy mode to the side of a high vehicle speed in a control circuit on the basis of the shift characteristic of the economy mode. In other words, the load of the engine above the reference value means the requirement for a large output (torque) of the engine, and the output-oriented shift characteristic is automatically set. Further, this conventional technique is such that the shift characteristic is returned from the power mode to the economy mode when the vehicle speed becomes smaller than a predetermined value or a foot brake pedal is depressed.

However, in this conventional technique, the reference value to be used when the shift characteristic is altered is set to a certain constant value, so that the shift characteristic cannot be altered to an appropriate one so as to satisfy the requirement for acceleration by the operator.

This matter will be described more specifically. For instance, when the vehicle is running at a stationary speed with the load of the engine on the order of a value somewhat exceeding the reference value, the shift characteristic is altered to an output-oriented power mode although the economy mode is preferred from a standpoint of mileage or the like. To the contrary, when the current vehicle speed at which the vehicle is running at a stationary speed is considerably smaller than the load of the engine corresponding to the reference value, the shift characteristic is not altered and it is in the economy mode as it is as long as the load of the engine does not reach the reference value or higher, even if an accelerator pedal is depressed, and no sufficient degree of acceleration can be obtained.

Japanese Patent Unexamined Publication (kokai) No. 22,698/1976 discloses another conventional technique in which the shift line is altered immediately when the accelerator pedal is depressed rapidly.

However, for this conventional technique in which the shift characteristic is altered immediately in accordance with a change rate of the load of the engine, the output-oriented shift characteristic is automatically set because the change rate of the load of the engine becomes too large even if the load of the engine is in an absolutely small range, namely, even if no output (torque) of the engine is required to that large extent. To the contrary, even in a range in which the load of the engine is absolutely large, namely, even when the output (torque) of the engine is required, the mileage-oriented shift characteristic is automatically set due to a small change rate of the load of the engine.

SUMMARY OF THE INVENTION

Therefore, the present invention has the object to provide a shift control system of an automatic transmission for an automotive vehicle, which is adapted so as to appropriately alter a shift characteristic of the automatic transmission in response to the requirement for acceleration by the operator.

Another object of the present invention is to provide a shift control system of an automatic transmission of an automotive vehicle, which is adaptable so as to appropriately alter a shift characteristic of the automatic transmission in response to the requirement for acceleration by the operator, when the shift characteristic is to be altered to an output-oriented shift characteristic when a load of the engine becomes a value equal to or larger than a predetermined value.

In order to achieve the object, the present invention consists of a shift control system of an automatic transmission of an automotive vehicle, comprising:

a load detecting means for detecting a load of an engine;

a load change rate detecting means for detecting a change rate of the load of the engine; and a shift characteristic altering means for altering a shift characteristic of the automatic transmission in accordance with the load of the engine and the change rate of the load of the engine in response to a signal from said load detecting means and said load change rate detecting means, respectively.

With this arrangement, the shift control system can accurately determine whether the operator actually requires the output (torque) of an engine by taking the change rate of the load of the engine as well as the load of the engine into consideration. As a matter of course, the shift characteristic can be altered to an output-oriented shift characteristic when it is determined that that the operator requires the output of the engine. To the contrary, for instance, when it can be determined that the operator does not require the output of the engine to a very large extent even if the change rate of the load of the engine would be large enough, the automatic transmission may be controlled without altering the shift characteristic.

In order to achieve the second object, the present invention consists of a shift control system of the automatic transmission of the automotive vehicle, comprising:

a load detecting means for detecting a load of an engine;

a shift characteristic altering means for altering a shift characteristic of the automatic transmission from a first shift characteristic to a second shift characteristic which is an output-oriented characteristic more than the first shift characteristic when the load of the engine becomes a value equal to or larger than a predetermined reference value in response to a signal from said load detecting means;

a load change rate detecting means for detecting a change rate of the load of the engine; and a reference value altering means for altering said reference value to a smaller value in accordance with the change rate of the load of the engine to be detected by said load change rate altering means when the change rate of the load of the engine is larger than when the change rate of the load of the engine is smaller.

This arrangement of the shift control system of the automatic transmission is likely to alter the shift characteristic of the automatic transmission from the mileage-oriented shift characteristic to the output-oriented shift characteristic due to a change of the reference value to a smaller value when the operator depresses the accelerator pedal at a fast speed so as to require a large magnitude of acceleration. Therefore, in instances where the accelerator pedal is depressed at a fast speed so as to reach a region that exceeds the reference value which can be regarded as requiring the output (torque) of the engine, this arrangement allows the shift characteristic to be shifted immediately to the output-oriented shift characteristic. Therefore, the present invention can appropriately alter the shift characteristic of the automatic transmission in correspondence with the requirement for acceleration by the operator.

Other objects, features and advantages of the present invention will become apparent in the course of the description of the preferred embodiments, which follows, in conjunction with the accompanying drawings.

DESCRIPTION OF THE PREFERRED EMBODIMENTS

The present invention will be described more in detail with reference to the accompanying drawings.

Figure 1:
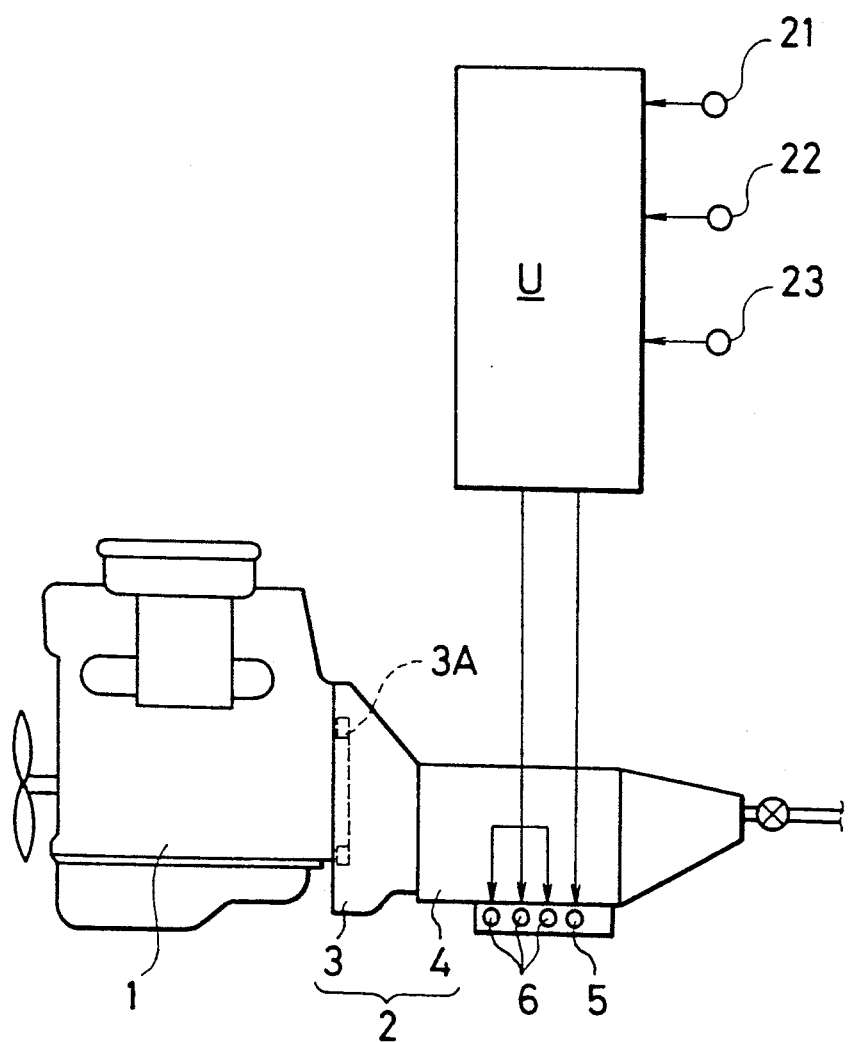
FIG. 1 is a diagrammatic representation showing an overall system according to an embodiment of the present invention.

As shown in FIG. 1, reference numeral 1 denotes an engine of an Otto type and the output (torque) of the engine 1 is transmitted through an automatic transmission 2 to a driving wheel (not shown).

The automatic transmission 2 in this embodiment comprises a torque converter 3 equipped with a lockup clutch 3A and a multiple shift geartrain mechanism 4 having four forward driving ranges and one rearward driving range. The automatic transmission 2 is of a hydraulically operative type and the lockup clutch 3A is connected or disconnected by exciting or deenergizing a solenoid 5 built in its hydraulic circuit. Further, by changing a combination of excitation with deenergization of a plurality of solenoids 6 built in the hydraulic circuit, the multiple shift geartrain mechanism 4 performs a shift of speed ranges.

Figure 2:
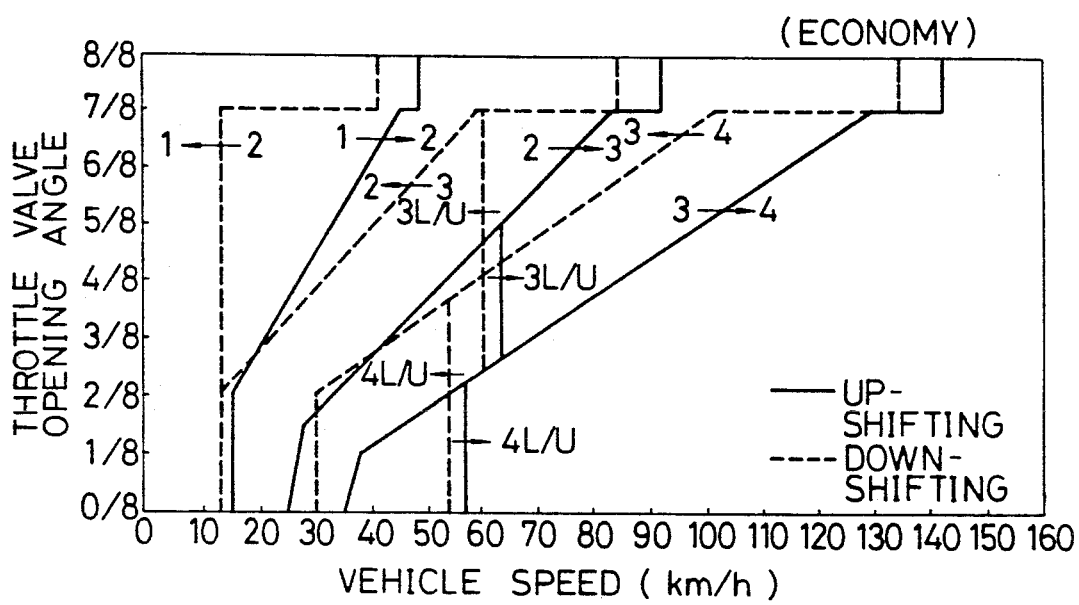
FIG. 2 is a diagram showing a shift characteristic for the economy mode.
Figure 3:
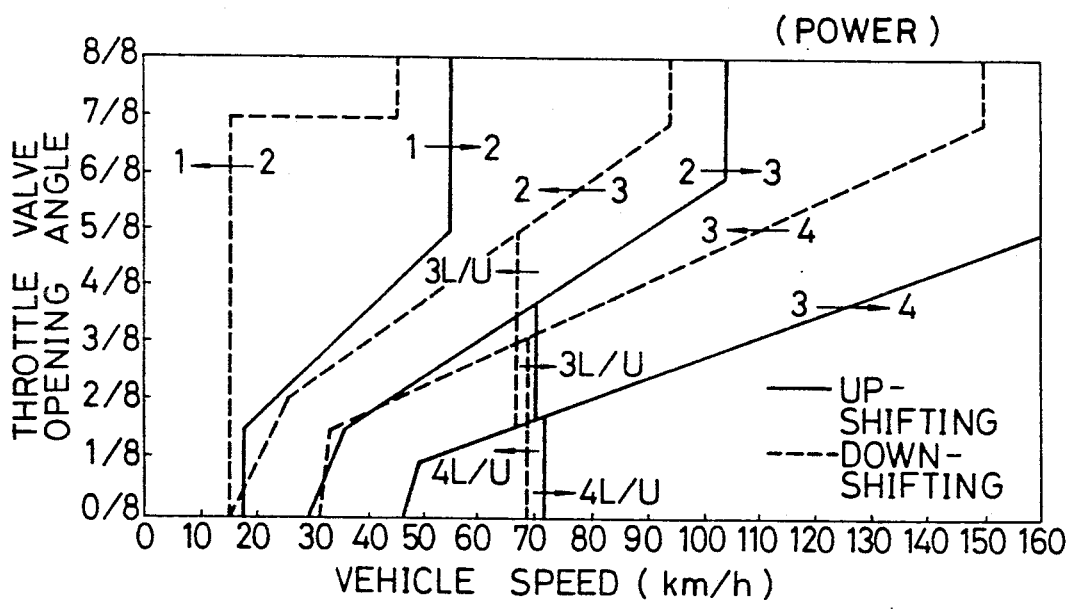
FIG. 3 is a diagram showing a shift characteristic for the power mode.

Referring to FIG. 1, reference symbol U denotes a control unit for a shift control utilizing a microcomputer. The control unit U receives signals from sensors 21 and 22 and a switch 23 while generating signals to the solenoids 5 and 6. The sensor 21 is to sense an opening angle of a throttle valve. The sensor 22 is to sense a vehicle speed. The switch 23 is to manually select a shift characteristic from four kinds of modes in this embodiment. More specifically, the four kinds of the modes include an economy mode as shown in FIG. 2, a power mode as shown in FIG. 3, an automatic (automatically switching) mode for automatically selecting either of the economy mode or the power mode, and a hold mode. Both of the economy mode as shown in FIG. 2 and the power mode as shown in FIG. 3 are independently and separately mapped. The shift characteristic based on the map for the power mode (FIG. 3) is such that its shift line is set on the high speed side, as compared with a mileage-oriented economy mode, thereby permitting an output-oriented shift. In this embodiment, when the economy mode or the power mode is selected by the switch 23, the shift characteristic is fixed to the mode selected and no change is made. Further, the hold mode is such that, as is known to the state of art, the third speed stage is fixed during speed range D, the second speed stage is fixed during the second speed range, and the first speed stage is fixed during the first speed range. It is noted that the automatic mode is the object for the present invention and that the economy mode is selected at ordinary running state while the economy mode is shifted to the power mode when the load of the engine reaches a reference value or higher. It is further noted that the present invention can be applied to the economy mode selected by the switch 23.

The control by the control unit U will be briefly described. Given the selection of the automatic mode by the switch 23, basically, the economy mode as shown in FIG. 2 is selected and a shift control is performed on the basis of the selected economy mode.

When the throttle valve opening angle TVO indicative of the load of the engine becomes equal to or larger than the predetermined reference value, namely, when the state in which the engine is driven becomes a high-load driving state, the shift characteristic is switched from the economy mode (FIG. 2) to the power mode (FIG. 3), thereby implementing the shift control based on the power mode.

Figure 4:
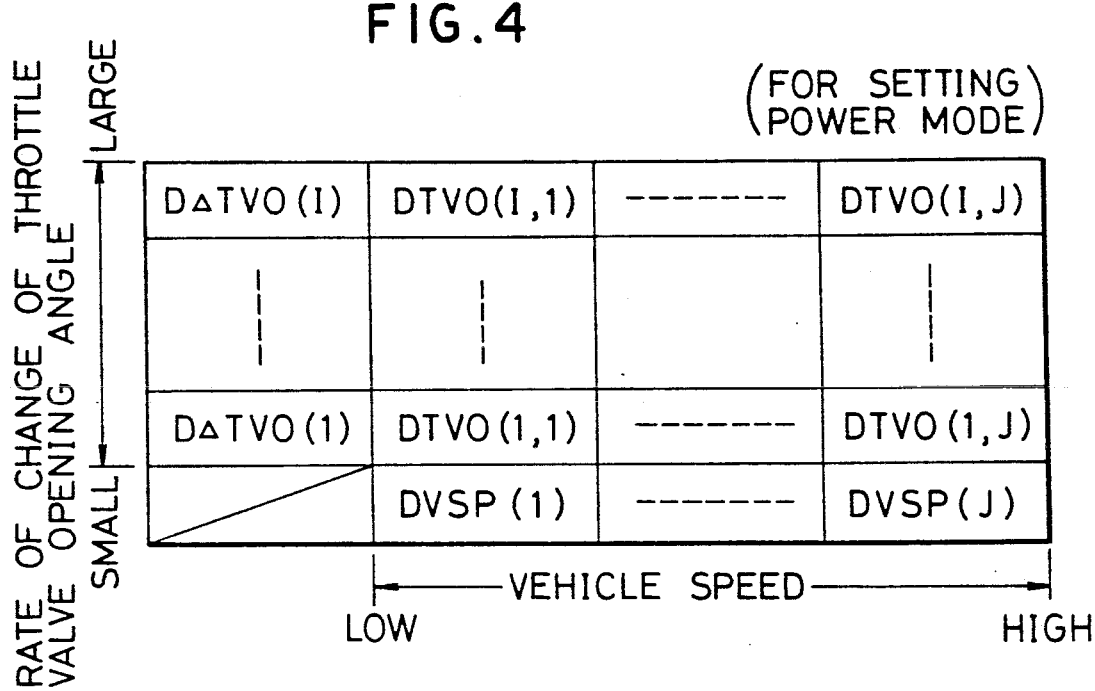
FIG. 4 is a map for setting the power mode.
Figure 6:
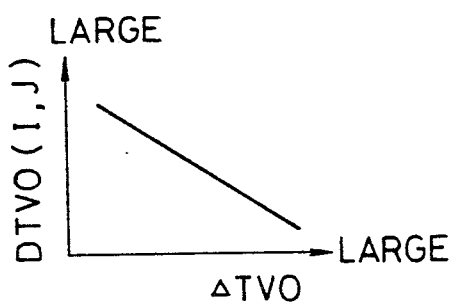
FIGS. 6 and 7 are graphs showing the tendency for setting the power mode as shown in FIG. 4.
Figure 7:
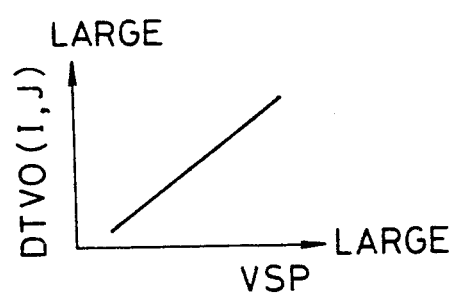

The reference value for switching the shift characteristic to the power mode is determined by a map value which is set by using the vehicle speed, VSP, and the change rate of the throttle valve opening angle, $\Delta$ TVO, as parameters as shown in FIG. 4. In FIG. 4, the vehicle speed is indicated as DVSP(J) (J=1, 2, ...) while the change rate of the throttle valve opening angle is indicated as D$\Delta$ TVO(I) (I=1, 2, ...), and the throttle valve opening angle serving as the reference value for switching the shift characteristic is indicated as DTVO-(I,J). In other words, when the actual throttle valve opening angle TVO reaches a value equal to or higher than the reference value DTVO(I,J) obtainable by collation with the maps as described hereinabove, the economy mode is switched to the power mode. FIG. 6 shows the correspondence relationship between the change rate of the throttle valve opening angle, $\Delta$ TVO, and the reference value DTVO(I,J) when the vehicle speed is set constant in FIG. 4. FIG. 7 shows the correspondence relationship between the vehicle speed VSP and the reference value DTVO(I,J) when the change rate of the throttle valve opening angle is set constant. As is apparent from FIG. 6, the reference value DTVO-(I,J) gets smaller as the change rate of the throttle valve opening angle (an increasing rate) gets larger, thereby making it easier to switch the economy mode to the power mode. Further, as is apparent from FIG. 7, the faster the vehicle speed VSP the larger the reference value DTVO(I,J).

Figure 5:
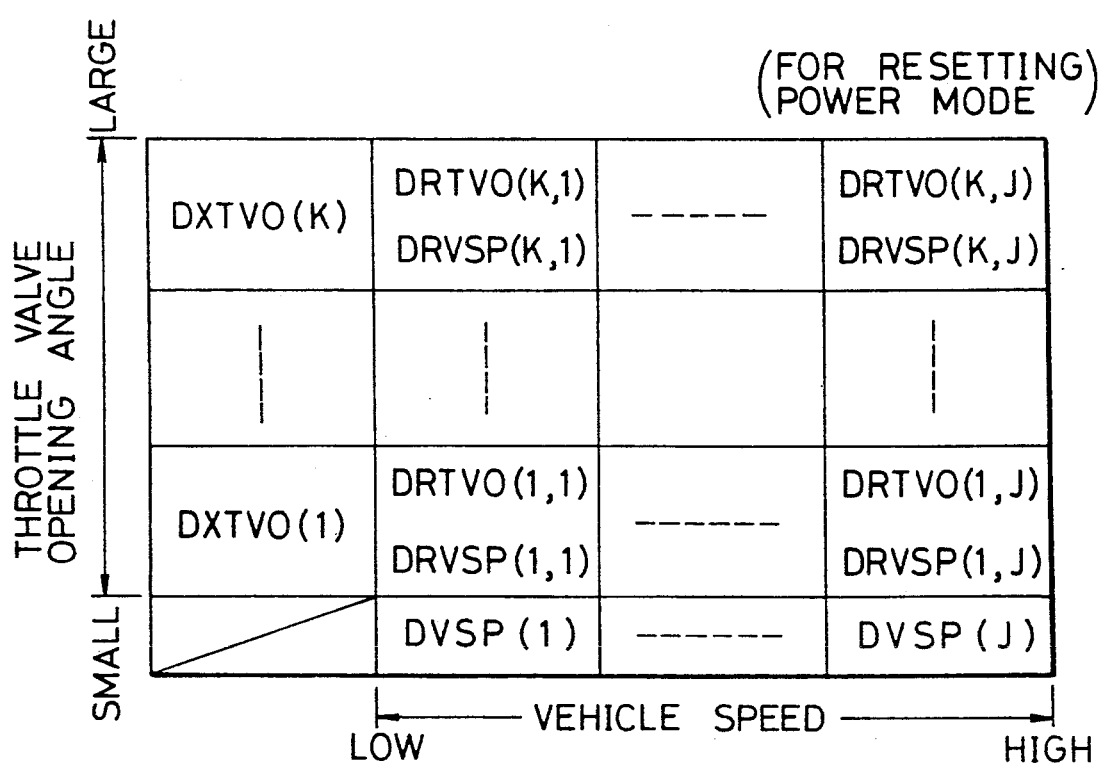
FIG. 5 is a map for resetting the power mode.
Figure 8:
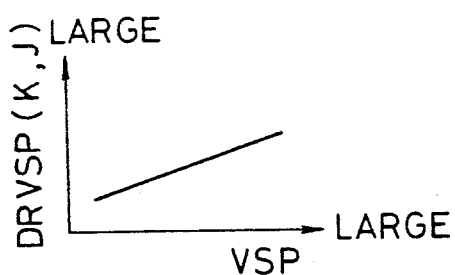
FIGS. 8 to 11, inclusive, are graphs showing the tendency for resetting the power mode as shown in FIG. 5.
Figure 9:
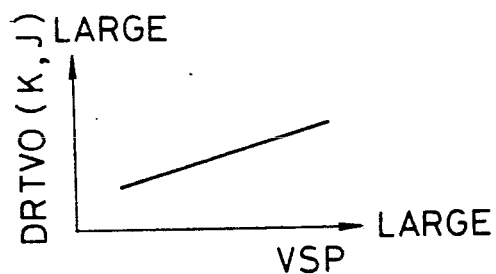
Figure 10:
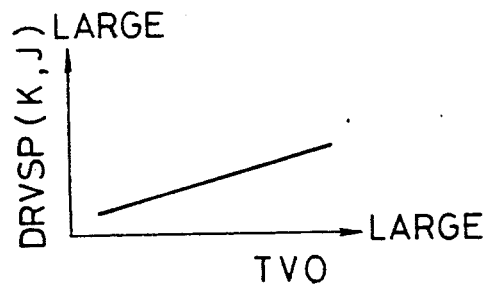
Figure 11:
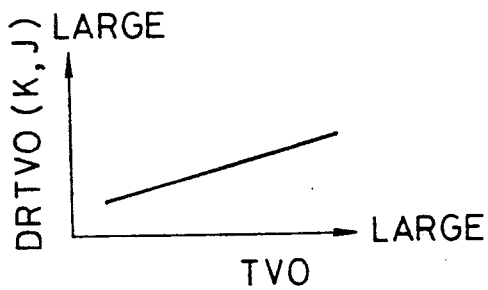

The power mode once switched is returned to the economy mode when two conditions are met: one condition is that the vehicle speed becomes larger than a return reference value and the other is that the throttle valve opening angle becomes smaller than a return reference value. In other words, the power mode is returned to the economy mode again when the driving state of the engine is transferred to a stationary driving state. As shown in FIG. 5, the return vehicle speed and the return throttle valve opening angle are stored as map values by using the vehicle speed and the throttle valve opening angle as parameters. In FIG. 5, DVSP(J) (J=1, 2, ...) is a vehicle speed for retrieving the map and DXTVO(I) (I=1, 2, ...) is a throttle valve opening angle for retrieving the map. And DRTVO(K,J) (K=1, 2, ..., J=1, 2, ...) is a return reference throttle valve opening angle, and DRVSP(K,J)) (K=1, 2, ..., J=1, 2, ...) is a return reference vehicle speed. FIGS. 8 to 11, inclusive, shows the correspondence relationship between the return reference values and the parameters as referenced in FIG. 5. More specifically, FIG. 8 shows the correspondence of the return reference vehicle speed DRVSP(K,J) to the vehicle speed VSP, and the relationship between them is such that the return reference vehicle speed DRVSP(K,J) gets larger as the vehicle speed VSP gets faster. FIG. 9 shows the correspondence of the return reference throttle valve opening angle DRTVO(K,J) to the vehicle speed VSP, and the relationship between them is such that the larger the return reference throttle valve opening angle DRTVO(K,J) the larger the vehicle speed VSP. FIG. 10 indicates the correspondence relationship of the return reference vehicle speed DRVSP(K,J) with respect to the throttle valve opening angle TVO, and the relationship between them is such that the return reference vehicle speed DRVSP(K,J) gets larger as the throttle valve opening angle gets larger. FIG. 11 illustrates the relationship between the return reference throttle valve opening angle DRTVO(K,J) and the throttle valve opening angle TVO, in which the larger the return reference throttle valve opening angle DRTVO(K,J) the larger the throttle valve opening angle TVO.

Figure 12A:
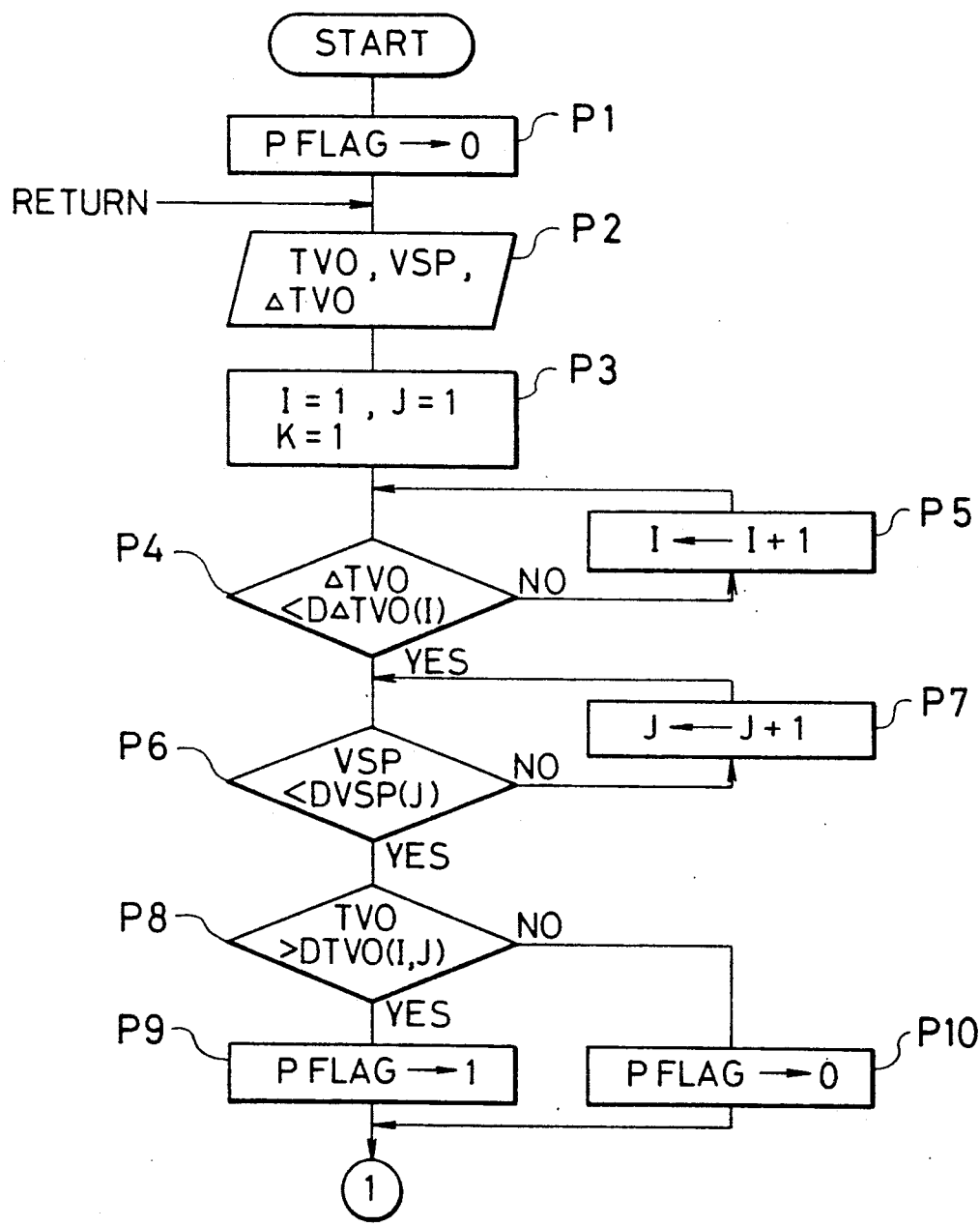
FIGS. 12A and 12B are flowcharts showing an example of the control according to the present invention.

Then, description will be made of the detail of control by the control unit U in conjunction with FIGS. 12A and 12B.

After the system is started, the system is initialized at step P1 at which a P flag is set to zero. The P flag is arranged such that "1" represents a power mode selection and "0" represents an economy mode selection.

Then, at step P2, the throttle valve opening angle TVO sensed by the sensor 21 and the vehicle speed VSP sensed by the sensor 22 are read, and a change rate, $\Delta$ TVO, of the throttle valve opening angle, i.e., a throttle-valve opening-angle change rate, is determined by differentiating the throttle valve opening angle TVO sensed immediately before (by giving the difference from the throttle valve opening angle previously sensed). Then the program flow goes to step P3 at which each of addresses I, J and K on the maps indicated in FIGS. 4 and 5 are set to one.

Thereafter, at step P4, a decision is made to determine if the throttle-valve opening-angle change rate $\Delta$ TVO is smaller than the change rate $\Delta$ TVO(I) on the map indicated in FIG. 4. If the result of decision at step P4 indicates that the throttle-valve opening-angle change rate $\Delta$ TVO is equal to or larger than the change rate $\Delta$ TVO(I), then the program flow goes to step P5 at which one is added to I, followed by the return to step P4. This processing is repeated until the change rate $\Delta$ TVO becomes smaller than the change rate $\Delta$ TVO(I). The processing at steps P4 and P5 is to determine the change rate $\Delta$ TVO(I) as shown in FIG. 4 corresponding to the current throttle-valve opening-angle change rate $\Delta$ TVO.

When the result of decision at step P4 indicates that the throttle-valve opening-angle change rate $\Delta$ TVO is smaller than the change rate $\Delta$ TVO(I), the program flow goes to step P6. The processing at step P6 and step P7 is likewise to determine the vehicle speed DVSP(J) shown in FIGS. 4 and 5 corresponding to the current vehicle speed VSP. More specifically, at step P6, a decision is made to determine if the current vehicle speed VSP is smaller than the vehicle speed DVSP(J). If the result of decision at step P6 indicates that the current vehicle speed is equal to or larger than the vehicle speed DVSP(J), on the one hand, the program flow goes to step P7 at which one is added to J, followed by the return to step P6 again. This processing is repeated until the current vehicle speed VSP becomes smaller than the speed DVSP(J).

Then, at step P8, a decision is made to determine if the current throttle valve opening angle TVO is larger than a memory value shown in FIG. 4, i.e., a setting reference value DTVO(I,J), on the basis of the results of the previous processing, D$\Delta$ TVO(I) and DVSP(J). If the result of decision at step P8 indicates that the current throttle valve opening angle TVO is larger than the memory value DTVO(I,J), on the one hand, then the program flow proceeds to step P9 at which the P flag is set to one, followed by proceeding to step P21. If it is decided at step P8 that the current throttle valve opening angle TVO is equal to or smaller than the memory value DTVO(I,J), on the other hand, then the program flow proceeds to step P10 at which the P flag is reset to zero, followed by proceeding to step P21.

Figure 12B:
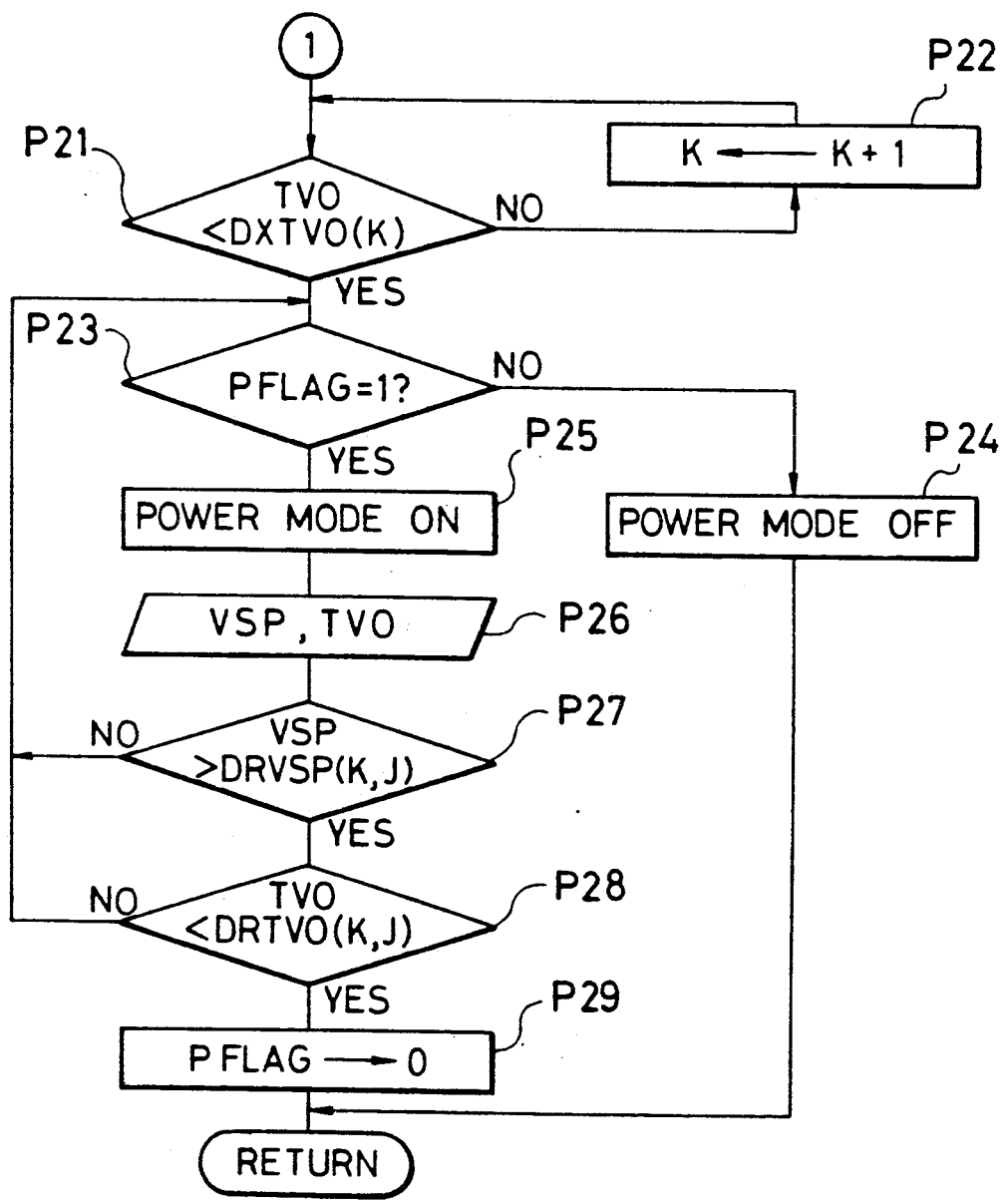

After step P9 or step P10, the program flow goes to step P21 of FIG. 12B. The processing at step P21 and step P22 of FIG. 12B is to determine the throttle valve opening angle DXTVO(K) shown in FIG. 5 corresponding to the current throttle valve opening angle TVO. More specifically, at step P21, a decision is made to determine if the current throttle valve opening angle TVO is smaller than the throttle valve opening angle DXTVO(K). If it is decided at step P21 that the current throttle opening angle TVO is equal to or larger than the throttle valve opening angle DXTVO(K), then the program flow goes to step P22 at which one is added to K, followed by returning to step P21. This processing is repeated until the current throttle valve opening angle TVO becomes smaller than the throttle opening angle DXTVO(K) and the program flow goes to step P23 when the result of decision at step P21 indicates that the current throttle valve opening angle TVO is smaller than the throttle valve opening angle DXTVO(K).

Then, at step P23, it is decided to determine if the P flag is set to one. When the result of decision at step P23 indicates that the P flag is set to zero, on the one hand, then the program flow goes to step P24 at which the power mode is turned off, followed by the return of the program flow, thereby controlling a shift on the economy mode. On the other hand, when it is decided at step P23 that the P flag is set to one, the program flow proceeds to step P25 at which the power mode is turned on, thereby allowing a shift control on the basis of the power mode.

After the power mode is turned on at step P25, the program flow goes to step P26 from which the processing for determining if the power mode is to be returned to the economy mode is made up to step P29. In other words, at step P26, the current vehicle speed VSP and the current throttle valve opening angle TVO are read, followed by proceeding to step P27 at which a decision is made to determine if the current vehicle speed VSP is larger than the return reference vehicle speed DRVSP(K,J). When the result of decision at step P27 indicates that the current vehicle speed VSP is equal to or smaller than the return reference vehicle speed DRVSP(K,J), on the one hand, the program flow goes back to step P23. When it is decided at step P27 that the current vehicle speed VSP is larger than the return reference vehicle speed DRVSP(K,J), on the other hand, then the program flow goes to step P28 at which a further decision is made to determine whether or not the current throttle valve opening angle TVO is smaller than the return reference throttle valve opening angle DRTVO(K,J). If the result of decision at step P28 indicates that the current throttle valve opening angle TVO is equal to or larger than the return reference throttle valve opening angle DRTVO(K,J), the program flow goes back to step P23. When it is decided at step P28 that the current throttle valve opening angle TVO is smaller than the return reference throttle valve opening angle DRTVO(K,J), the program flow goes to step P29 at which the P flag is reset to zero, thereby returning the power mode to the economy mode, followed by the return of the program flow.

It is to be understood that the present invention has been described by way of examples, however, it can be noted that as the load of the engine, there may be appropriately adopted various ones, such as an accelerator opening angle, an amount of intake air, an amount of fuel injected (particularly in the case of a diesel engine).

It is further to be understood that various other embodiments and variants are possible within the spirit and scope of the invention.

What is claimed is:

1. A shift control system of an automatic transmission, comprising:
   a load detecting means for detecting a load of an engine;
   a load change rate detecting means for detecting a change rate of the load of the engine; and
   a shift characteristic altering means for altering a shift characteristic of the automatic transmission in accordance with the load of the engine and the change rate of the load of the engine in response to a signal from said load detecting means and said load change rate detecting means, respectively,
   wherein said shift characteristic altering means alters the shift characteristic of the automatic transmission to produce a higher output level of the engine in accordance with an output signal of the load change rate detecting means showing an increase in the change rate of the load of the engine.

2. A shift control system of an automatic transmission, comprising:
   a load detecting means for detecting a load of an engine;
   a shift characteristic altering means for altering a shift characteristic of the automatic transmission from a first shift characteristic to a second shift characteristic which is an output-oriented characteristic more than the first shift characteristic when the load of the engine becomes a value equal to or larger than a reference value in response to a signal from said load detecting means;
   a load change rate detecting means for detecting a change rate of the load of the engine; and a reference value altering means for altering said reference value to a smaller value in accordance with the change rate of the load of the engine to be detected by said load change rate altering means when the change rate of the load of the engine is larger than when the change rate of the load of the engine is smaller.

3. A shift control system of the automatic transmission as claimed in claim 2, wherein said reference value altering means is to gradually alter said reference value to a smaller value in response to the change rate of the load of the engine as the change rate of the load of the engine becomes larger.

4. A shift control system of the automatic transmission as claimed in claim 2, further comprising a rotational number detecting means for detecting the number of revolutions of the engine;
   wherein said reference value altering means for altering said reference value to a smaller value in accordance with the change rate of the load of the engine to be detected by said load change rate altering means when the change rate of the load of the engine is larger than when the change rate of the load of the engine is smaller and for altering said reference value to a smaller value when the number of revolutions of the engine is smaller than when the number of revolutions of the engine is larger.

5. A shift control system of the automatic transmission as claimed in claim 2, wherein said shift characteristic altering means is to alter a shift characteristic by switching maps of said first shift characteristic and said second shift characteristic.

6. A shift control system of the automatic transmission as claimed in claim 2, wherein said reference value altering means determines said reference value on the basis of a value of a map of said reference value.

7. A shift control system of the automatic transmission as claimed in claim 2, wherein said first shift characteristic is an economy mode which is mileage-oriented and said second shift characteristic is a power mode in which a shift line is set on a high speed side with respect to said economy mode.

8. A shift control system of the automatic transmission as claimed in claim 2, wherein said load detecting means is to detect the load of the engine by a throttle valve opening angle.

9. A shift control system of the automatic transmission as claimed in claim 2, wherein said load change rate detecting means is to detect the change rate of the load of the engine by a change rate of a throttle valve opening angle.

10. A shift control system of the automatic transmission as claimed in claim 2, further comprising:
a driving state detecting means for detecting a driving state of the engine; and
a shift characteristic returning means for returning the shift characteristic of the automatic transmission from said second shift characteristic to said first shift characteristic in response to a signal from said driving state detecting means, when the driving state of the engine is transferred to a state of stationary driving.

11. A shift control system of the automatic transmission as claimed in claim 10, wherein:
said driving state detecting means comprises the load detecting means for detecting the load of the engine and a vehicle speed detecting means for detecting a vehicle speed; and
said shift characteristic returning means is to return the shift characteristic of the automatic transmission from said second shift characteristic to said first shift characteristic on condition that the load of the engine detected by said load detecting means is smaller than a predetermined first returning reference value and that the vehicle speed detected by said vehicle speed detecting means is larger than a predetermined second returning reference value.

12. A shift control system of the automatic transmission as claimed in claim 11, wherein:
said predetermined first returning reference value is previously mapped by using the vehicle speed and the load of the engine as parameters to give a mapped first returning reference value; and
said mapped first returning reference value is set to a larger value when the vehicle speed becomes larger than when the vehicle speed becomes smaller and to a larger value when the load of the engine becomes larger than when the load of the engine becomes smaller.

13. A shift control system of the automatic transmission as claimed in claim 11, wherein:
said predetermined second returning reference value is previously mapped by using the vehicle speed and the load of the engine as parameters to give a mapped second returning reference value; and
said mapped second returning reference value is set to a larger value when the vehicle speed becomes larger than when the vehicle speed becomes smaller and to a larger value when the load of the engine becomes larger than when the load of the engine becomes smaller.

* * * * *